United States Patent [19]
MacDonald

[11] Patent Number: 5,933,481
[45] Date of Patent: *Aug. 3, 1999

[54] METHOD OF CONTROLLING CALL TRAFFIC IN A TELECOMMUNICATION SYSTEM

[75] Inventor: Douglas Malcolm MacDonald, Ottawa, Canada

[73] Assignee: Bell Canada, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,194

[22] Filed: Feb. 29, 1996

[51] Int. Cl.⁶ .................................................. H04M 15/00
[52] U.S. Cl. ........................... 379/137; 379/113; 379/221
[58] Field of Search .................... 379/113, 133, 379/134, 137, 139, 207, 219, 230, 220, 221, 265, 266, 309, 111, 112; 455/453

[56] References Cited

U.S. PATENT DOCUMENTS

| | | | |
|---|---|---|---|
| 4,224,479 | 9/1980 | Crawford | 179/18 DA |
| 4,497,978 | 2/1985 | Schoute et al. | 179/9 |
| 4,511,762 | 4/1985 | Stockdale | 179/10 |
| 4,564,725 | 1/1986 | Daisenberger | 179/8 A |
| 4,613,729 | 9/1986 | Daisenberger | 179/8 A |
| 4,626,624 | 12/1986 | Daisenberger | 379/137 |
| 4,626,625 | 12/1986 | Daisenberger | 379/137 |
| 4,629,830 | 12/1986 | Daisenberger | 340/825.03 |
| 4,907,256 | 3/1990 | Higuchi et al. | 379/137 |
| 5,042,064 | 8/1991 | Chung et al. | 379/113 |
| 5,060,258 | 10/1991 | Turner | 379/134 |
| 5,067,074 | 11/1991 | Farel et al. | 379/113 |
| 5,295,183 | 3/1994 | Langlois et al. | 379/113 |
| 5,359,649 | 10/1994 | Rosu et al. | 379/220 |
| 5,423,086 | 6/1995 | Hidaka et al. | 379/113 |
| 5,425,086 | 6/1995 | Hidaka et al. | 379/113 |
| 5,513,257 | 4/1996 | Yoo et al. | 379/220 |
| 5,548,533 | 8/1996 | Gao et al. | 364/514 |
| 5,574,770 | 11/1996 | Yoo et al. | 379/134 |

FOREIGN PATENT DOCUMENTS 0 426 355 A3  10/1990  European Pat. Off. ......... H04Q 3/00

OTHER PUBLICATIONS

*A New Call Gapping Algorithm for Network Traffic Management*, P.M.D. Turner and P.B. Key, Teletraffic and Datatraffic in a Period of Change, vol. 14, 13th International Teletraffic Congress Copenhagen 1991.

Primary Examiner—Curtis A. Kuntz
Assistant Examiner—Binh K. Tieu
Attorney, Agent, or Firm—Thomas Adams

[57] ABSTRACT

A method of controlling call traffic in a telecommunication system by dynamically altering the rate at which offered calls are accepted includes the steps of successively determining the offered call rate, and accepting calls from the offered calls, at a lower rate, as the offered call rate increases. For accepting the offered calls, at least two call-gapping intervals are used. The method includes selecting the shorter gapping interval whenever the offered call rate is below a threshold value and the longer gapping interval whenever it is above that value.

5 Claims, 2 Drawing Sheets

METHOD OF CONTROLLING CALL TRAFFIC IN A TELECOMMUNICATION SYSTEM

This invention relates to a method of controlling call traffic in a telecommunication system and more particularly a method of dynamically altering the rate at which offered calls are accepted, so as to control the volume of calls of a particular type allowed to continue to their destination thereby reducing the tendency of such types of traffic to cause congestion of switching routes and/or switching systems.

BACKGROUND OF THE INVENTION

Communications switching and signalling networks are subject to congestion and overload when the offered traffic is above the capacity of the network to handle the load and various techniques have been developed to control such overload and congestion for particular situations. One such control system which utilizes a call-gapping algorithm to control traffic volume in the system is disclosed in U.S. Pat. No. 5,060,258 entitled "Call Traffic Control" by Peter M. D. Turner, to which the reader is directed for reference. For further details on the application of this algorithm, as well as an excellent review of two prior algorithms, the reader is directed to a paper entitled "A New Call Gapping Algorithm for Network Traffic Management" by P. M. D. Turner and P. B. Key, 13th International Teletraffic Congress, Copenhagen (1991) volume 14, pp. 121–126. The contents of both of these documents are incorporated herein by reference.

In these existing call-gapping algorithms, the volume of calls allowed through the system, is always at or below the volume limit with very high offered traffic. However, it is desirable in some cases within operating communications networks to be able to firmly limit call volumes under conditions of heavy overload, while still allowing some greater volume when the degree of system overload is smaller. Such cases can arise, for example, when the network of a different service provider is interconnected to allow an exchange of calls. The expected traffic volumes may not be well estimated and it is desirable to carry as much of the traffic as reasonable. Under heavy overload, however, it is desirable to firmly limit the accepted traffic to achieve better fairness in the completion of calls from different sources. With the methods of the prior art, the operators of the communications system would have to change the control parameters as the volume of offered traffic varies in order to achieve this end.

SUMMARY OF THE INVENTION

The present invention provides a method of controlling call traffic which will limit the volume of accepted traffic when the offered load is much greater than the predetermined limit, while allowing a greater volume when the offered traffic is only slightly above this limit.

Thus in accordance with the present invention there is provided a method of controlling call traffic in a telecommunication system by dynamically altering the rate at which offered calls are accepted, characterised by the steps of: successively determining the offered call rate; and accepting calls from the offered calls, at a lower rate whenever said offered call rate exceeds a load threshold.

BRIEF DESCRIPTION OF THE DRAWINGS

An example embodiment of the invention will now be described with reference to the accompanying drawings in which.

DESCRIPTION OF PREFERRED EMBODIMENT

Figure 1:
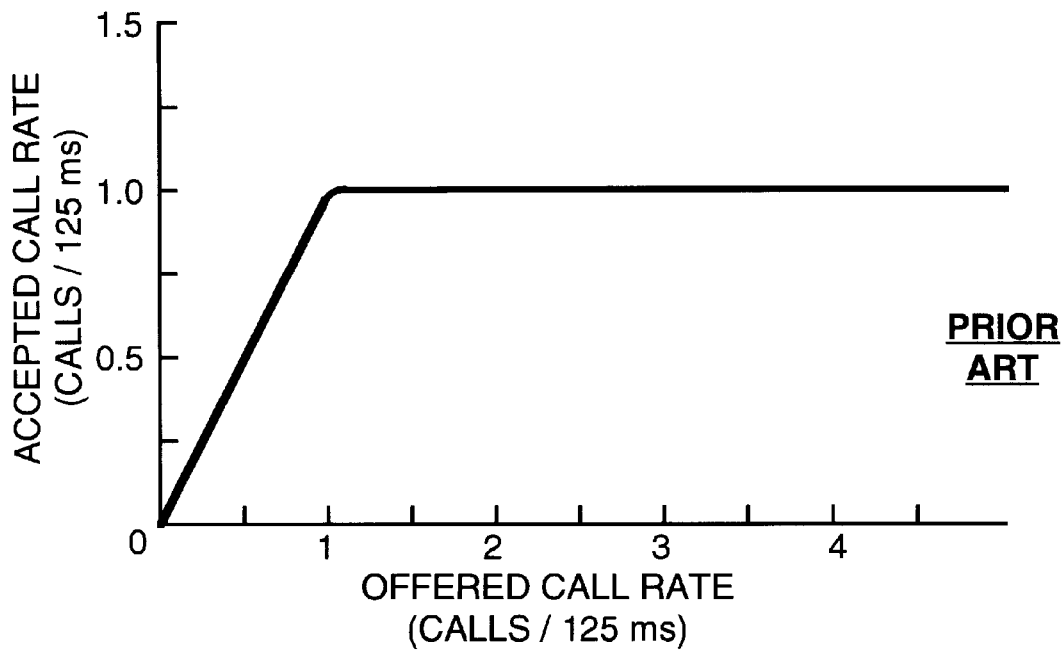
FIG. 1 is a graph illustrating accepted call rate versus offered call rate for a call-gapping algorithm described in the prior art.

FIG. 1 illustrates a graph of accepted call rate versus offered call rate, utilizing the call-gapping algorithm in the above referenced prior art patent and the paper by Turner et al. While the Turner method does not necessarily force a time gap between successive messages, common industry usage applies the term "gapping" to the general process of load control characterised by rejecting some offered messages and not others.

The horizontal portion of the solid line in the graph illustrates an accepted call rate of one accepted call per gapping interval. The Turner patent describes an embodiment which permits an allowance for unused gapping intervals to be carried forward (subject to defined limits) to subsequent intervals, so that the accepted call rate can have a transient rise above one accepted call per gapping interval. However, once the carry forward allowance is exhausted, as encountered during sustained overload conditions, the accepted call rate reverts back to one accepted call per gapping interval, and the balance of the offered calls during each gapping interval, are rejected. In another embodiment, the Turner algorithm also limits the maximum number of accepted calls in any one gapping interval, regardless of the number of unused gapping intervals carried forward.

The Turner algorithm provides little deviation from the ideal call acceptance rate for varying offered call rates. However, in some cases as, for example, with interconnecting telecommunications systems, it is desirable to accept as many calls as possible, even more than the engineered design level, as long as this extra acceptance is not too great. Under heavy overload there is still the need to strictly limit allowed calls so that network integrity can be maintained. It is this aspect of the Turner algorithm that the present invention seeks to address.

Figure 2:
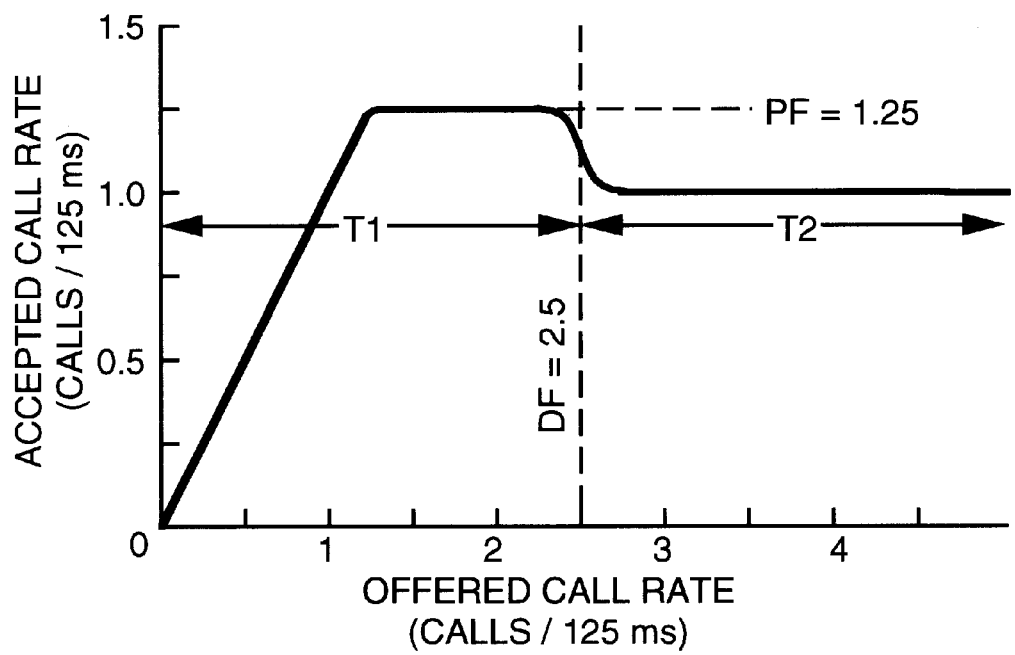
FIG. 2 is a graph illustrating accepted call rate versus offered call rate for a call-gapping algorithm in accordance with the present invention.
Figure 3:
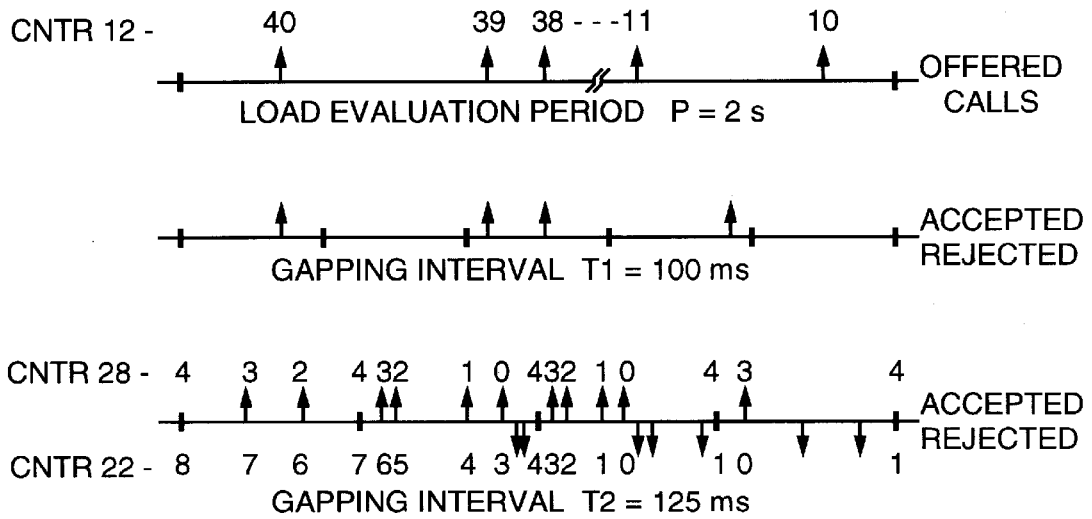
FIG. 3 is a schematic representation of gapping intervals which are dynamically selected to control the accepted call rate under varying offered call rates (ie: traffic loading conditions), as illustrated in the graph of FIG. 2.

Referring to FIG. 2 and FIG. 3, the call-gapping algorithm of the present invention will be described with reference to a typical example. In this example, the accepted call rate during sustained overload conditions is set at an average of 8 calls per second, yielding a gapping interval $T2=125$ milliseconds. Under light overload conditions the accepted call rate is allowed to exceed the long term rate by 25%. The accepted call rate is then 10 calls per second, with a gapping interval $T1=100$ milliseconds, yielding a peaking factor $PF=1.25$ (ie: $T2/T1$). The load representing the transition between light and heavy overload is selected as being a rate 2.5 times the accepted call rate under heavy overload. This results in a dropping factor $DF=2.5$. A load evaluation period P is selected as 20 times the gapping interval T1 during light loads, or $P=2$ seconds. A load threshold LT used in the load evaluation, is defined by the following equation:

$LT = 20 \times DF/PF$ to yield a threshold value LT=40 incoming calls per load evaluation period P.

Offered calls are accepted or rejected using the technique described by Turner, with the gapping interval parameter of the Turner algorithm modified as a result of the load evaluation process. When the incoming call rate is determined at the expiry of a load evaluation period P as being below the threshold level LT defined by the dropping factor DF, the call-gapping algorithm uses the gapping interval T1. When the load is at or above the level LT determined by the dropping factor, the gapping interval is changed to the value T2.

Hence when light overload conditions exist, as shown in the left hand portion of FIG. 2, the call acceptance rate is greater than the design maximum for heavy overloads, as shown in the right hand portion of the FIG. The key advantage of this call-gapping algorithm is that it allows the acceptance of more offered calls under light loads, while maintaining the designed allowance for offered calls when a major overload to the system is encountered.

While this example selects one of two gapping interval values based on the offered call count determined during successive load evaluation periods P, this could be extended to allow a selection of one of a plurality of gapping interval values, depending on that count.

Also, while this example utilizes the Turner algorithm for a basic call-gapping process, the method of this invention may also be applied to vary the gapping interval parameters of other gapping algorithms such as those outlined in Turner's description of the prior art.

Figure 4:
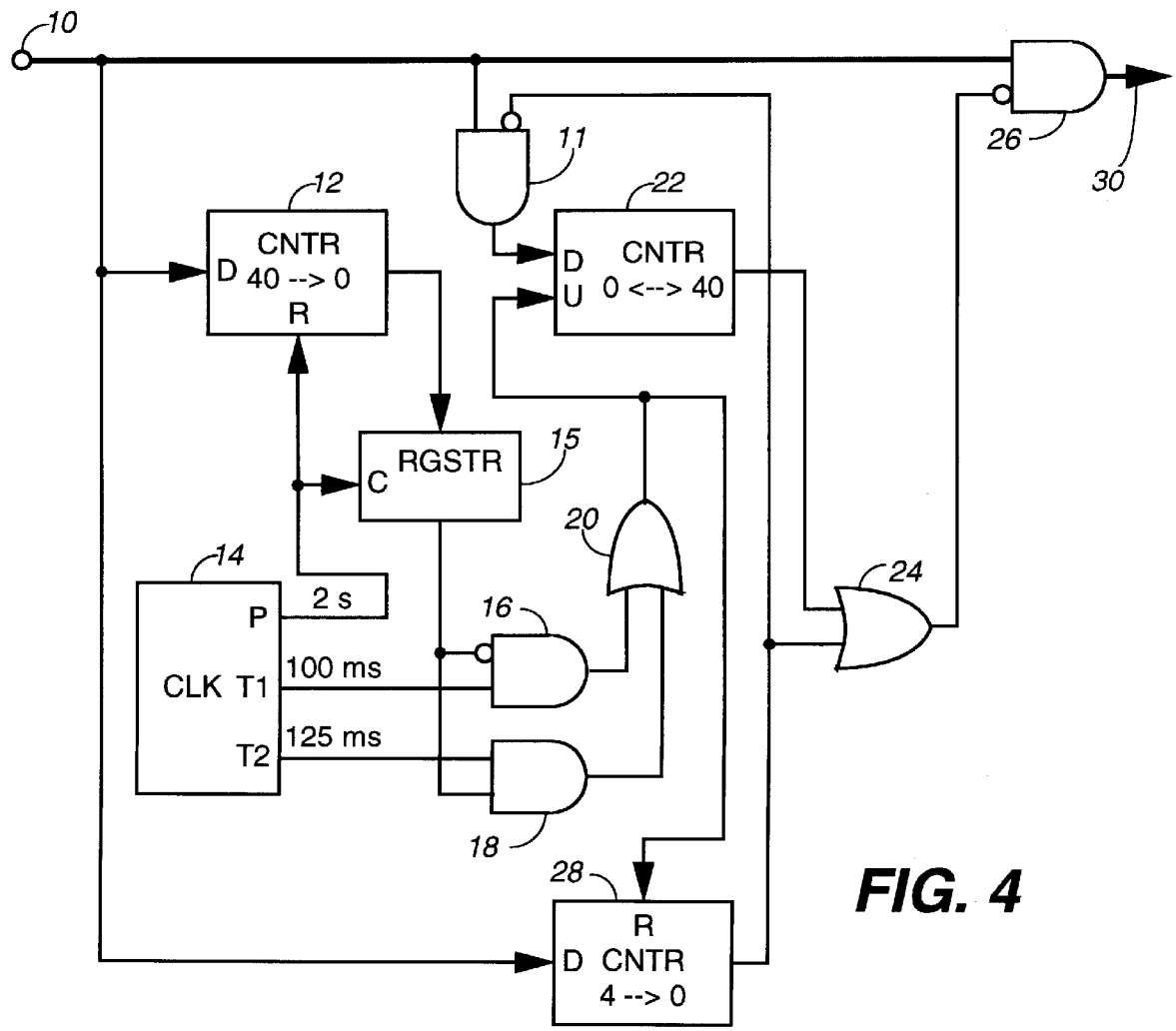
FIG. 4 is a block schematic diagram of a control circuit which forms part of a telecommunication system, for generating the call-gapping algorithm of the invention, so as to dynamically control the accepted call rate, which is determined during successive load evaluation periods, as illustrated in the graph of FIG. 2.

The call-gapping algorithm will be manifest by reference to the control circuit of FIG. 4. In the control circuit, offered call signals connected to its input 10, are coupled to the down input D of a load evaluation threshold counter 12, that is reset to the load threshold LT=40 every load evaluation period P=2 seconds, in response to an evaluation period signal P from a clock generator 14. Each offered call signal that is received by the control circuit, decrements the counter 12 by 1 until it reaches 0, whereupon its output, initially LO, goes HI signalling that at least 40 calls have been received during the current load evaluation period P. The output value at the end of the load evaluation period P is stored in a holding register 15 for the duration of the next load evaluation period. This is repeated during each successive load evaluation period P so that the output of the register 15 dynamically tracks the average call traffic. During light incoming call traffic conditions, when less than 40 calls per period P are received, the control signal from the output of the register 15 stays LO. This enables AND gate 16 through its inverted input, so that the gapping interval control signal T1=100 milliseconds from the clock 14, is coupled through the AND gate 16 to one input of OR gate 20. Conversely, when heavy incoming call traffic is present and more than 40 calls per evaluation period P are received, the output from the register 15 goes HI thereby disabling the AND gate 16 and enabling AND gate 18, so as to couple the gapping interval control signal T2=125 milliseconds from the clock 14 to the other input of the OR gate 20.

Hence, depending upon the density of the incoming call signals, either gapping interval signal T1 or gapping interval signal T2, is coupled through the OR gate 20 to the incrementing input U of an up/down counter 22, thereby incrementing the counter 22 by 1 each call-gapping interval until its upper limit of 40 is reached. The maximum value of the counter 22 represents the "Global Counter" described in Turner's paper. Conversely each incoming offered call signal from the input 10, is coupled through one input of an AND gate 11 to the decrementing input D of the counter 22. Each incoming call signal decrements the counter 22 by 1 until its lower limit of 0 is reached, whereupon the counter's output, otherwise LO, goes HI. The counter 22 never exceeds its upper or lower limits, but moves between the two values. The HI output from the counter 22, when coupled through OR gate 24 to the inverted input of AND gate 26, disables the gate 26 so that any additional incoming call signals are blocked or rejected during the current gapping interval.

Incoming call signals from the input 10 are also coupled to the decrementing input D of a limit counter 28 which is reset to 4, at the beginning of each gapping interval, by either the gapping signal T1 or T2 coupled from the output of the OR gate 20. The limit counter 28 represents the limit of the call attempts in one interval identified as the "Local Counter" in the Turner paper. Once reset, each incoming call signal decrements the counter 28 by 1 until 0 is reach where it remains until again reset at the beginning of the next gapping interval. Whenever the counter 28 reaches 0, its output, otherwise LO, goes HI which disables the AND gate 26 in a similar manner to that of the counter 22. Thus, when either of the control signals from the counters 22 or 28 are HI, incoming call signals are blocked or rejected.

In this example of the preferred embodiment, the timers T1 and T2 will be synchronous with expiry of the timer P. In other embodiments when this is not so, the circuit should be arranged so that when the register 15 makes a transition from one output state to another, an appropriate signal is sent to the clock 14. On reception of this signal, the clock 14 will reset the timer output (T1 or T2) which will be used for the next load evaluation period in synchronism with the other timer (which is in current use) so that a clean transition is made between the two clock rates.

This will be further manifest with reference to FIG. 3 in which the upper waveform illustrates the decrementing of the load threshold counter 12 by the incoming call signals during a typical load evaluation period P. The middle waveform illustrates incoming accepted calls at the output 30 of the control circuit, during light loading conditions for several gapping intervals under control of the clock signal T1.

The lower waveform in FIG. 3 illustrates, in more detail, an example of call control in accordance with the call-gapping algorithm. Initially, assume the system has been running for some time and the up-down counter 22 has been incremented to 8 by either or both of the gapping interval signals T1 or T2. At the beginning of each interval, the limit counter 28 is reset to 4. As each incoming call is accepted, both counters 22 and 28 are decremented by 1 until the second gapping interval signal, when the up-down counter 22 is incremented by 1 to a value of 7 while the limit counter 28 is reset to 4.

During the second gapping interval, the counter 28 is decremented to 0 by incoming call signals whereupon the output of the counter 28 goes HI thereby blocking the AND gate 26, so that the further two incoming call signals during the gapping interval are rejected. The output of the counter 28 also controls the decrementing input D to the counter 22 through the inverting input to the AND gate 11, so that the counter 22 is not decremented by incoming calls that are blocked by the limit counter 28.

During the subsequent interval both counters 22 and 28 are decremented to 0 by incoming call signals and the subsequent three calls are rejected. Next, the counter 28 is again reset to 4 while the counter 22 is incremented by 1 to a value of 1. As a result only one call signal is accepted before the counter 22 is decremented to 0 and all further calls during the interval are rejected. This condition will continue as long as there is heavy incoming call traffic, thereby limiting the maximum average accepted call signal to one per gapping interval. When the heavy traffic subsides with less than 40 incoming calls per load evaluation period P, the system will revert to the gapping interval T1 so that up to an additional 25% of the incoming call signals can be accepted.

In the illustrated embodiment, the limit counter 28 limits the accepted calls to a maximum of 4 per gapping interval regardless of whether it is currently being controlled by the gapping interval signal T1 or T2. It will be evident that this restriction could be removed simply by disabling the output of the counter 28.

As described, up to 40 unused gapping intervals can be stored in the up-down counter 22 and thus carried forward to subsequent intervals as described in the Turner paper. However, this number can be readily increased or decreased simply by altering the limits of the counter 22 and in the extreme, limiting the number of accepted calls to one per gapping interval with none carried forward to subsequent intervals.

In the illustrated embodiment, the load evaluation period is set at 20 times the value T1. However, this number can be readily increased or decreased simply by altering the interval set by the clock output P and adjusting the initial value of the counter 12 in a proportionate manner.

While the call-gapping algorithm has been described utilizing a hardware implementation, it could also be readily implemented in software to achieve the same result. Likewise, while the gapping algorithm of this invention has been described in relation to offered calls, it may also be applied to limit other manifestations such as messages within a signalling system. Consequently, in the appended claims, the term "calls" should be interpreted as embracing such other manifestations.

What is claimed is:

1. A method of controlling call traffic in a telecommunication system by dynamically altering the rate at which incoming offered calls are accepted, characterised by the steps of:

successively determining the offered call rate of the incoming offered calls by counting said incoming offered calls during each of successive gapping intervals;

accepting calls from among said incoming offered calls, at a first rate when said offered call rate is no greater than a set value; and accepting calls from among said incoming offered calls, at a second rate whenever said offered call rate exceeds the set value, the second rate being lower than the first rate.

2. A method of controlling call traffic in accordance with claim 1, further characterised by the steps of:

accepting a maximum average of one incoming offered call per each successive gapping interval T1, whenever the offered call rate does not exceed the set value;

accepting a maximum average of one incoming offered call per each successive gapping interval T2, whenever the offered call rate exceeds the set value; and setting the gapping interval T1 shorter than the gapping interval T2, so that the maximum average of accepted calls is lower during the gapping interval T2 than the gapping interval T1.

3. A method of controlling call traffic in accordance with claim 2, in which the set value is a load threshold value LT of offered calls per load evaluation period P, and in which successively determining the offered call rate is further characterised by the step of:

successive counting the number of said incoming offered calls during each load evaluation period P to determine the offered call rate, each period P being at least a magnitude longer than either of the gapping intervals T1 or T2, so as to determine the average offered call rate for calls being received.

4. A method of controlling call traffic in accordance with claim 2, further characterised by the step of:

accepting a limited plurality of offered calls in any one gapping interval so as to average, with previous gapping intervals having no offered calls, one offered call per successive gapping interval.

5. A method of controlling call traffic in a telecommunication system by dynamically altering the rate at which incoming offered calls are accepted, characterised by the steps of:

successively determining the offered call rate of the incoming offered calls;

accepting all incoming offered calls when the offered call rate is below a first preset value;

accepting calls from among said incoming offered calls at a first fixed rate when said offered call rate is greater than said first preset value; and accepting calls from among said incoming offered calls at a second fixed rate when said offered call rate is greater than a second preset value, said second fixed rate being lower than said first fixed rate, and said second preset value being higher than said first preset value.

* * * * *